United States Patent
Cowan et al.

(10) Patent No.: US 10,915,423 B2
(45) Date of Patent: Feb. 9, 2021

(54) SPREADSHEET MANAGEMENT AND AUTOMATED REVIEW

(71) Applicant: JPMorgan Chase Bank N.A., New York, NY (US)

(72) Inventors: Julie Cowan, Garden City, NY (US); Disha Dua, Windsor, NJ (US); Liang Sun, New York, NY (US); Felix Shamis, Fair Lawn, NJ (US); Suresh Gopalakrishnan, East Windsor, NJ (US); Meshraj Khatiwada, Newark, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/244,736

(22) Filed: Jan. 10, 2019

(65) Prior Publication Data
US 2020/0226049 A1 Jul. 16, 2020

(51) Int. Cl.
*G06F 9/44* (2018.01)
*G06F 11/36* (2006.01)
*G06F 21/57* (2013.01)

(52) U.S. Cl.
CPC ...... *G06F 11/3604* (2013.01); *G06F 11/3692* (2013.01); *G06F 21/577* (2013.01)

(58) Field of Classification Search
CPC . G06F 11/3604; G06F 11/3692; G06F 21/577
USPC .......................... 717/101–117, 120–123, 124
See application file for complete search history.

(56) References Cited

U.S. PATENT DOCUMENTS

| | | | | |
|---|---|---|---|---|
| 7,840,933 | B2* | 11/2010 | Dixon | G06Q 10/06 717/100 |
| 9,330,160 | B2* | 5/2016 | Wadhwani | G06F 16/284 |
| 2007/0282876 | A1* | 12/2007 | Diao | G06Q 10/06 |
| 2010/0049565 | A1* | 2/2010 | Aebig | G06Q 10/10 705/7.28 |
| 2010/0050230 | A1* | 2/2010 | Aebig | G06F 16/93 726/1 |
| 2010/0050264 | A1* | 2/2010 | Aebig | G06F 21/577 726/25 |
| 2012/0259752 | A1* | 10/2012 | Agee | G06Q 40/00 705/35 |

OTHER PUBLICATIONS

Diligence, "Rainbow Governance in association with Diligence for Excel™", 2017, DiligenceForExcel.com, 79 pages. (Year: 2017).*

* cited by examiner

*Primary Examiner* — Ted T. Vo
(74) *Attorney, Agent, or Firm* — Greenblum & Bernstein, P.L.C.

(57) ABSTRACT

A system for and method of analyzing user tools to detect and remediate those tools posing a high risk to an organization. The system and method involve calculating user tool complexity to predict potential tool failures and displaying the potential failures to a user for further analysis. Remediation tools are provided to permit the user to correct or minimize the potential failures. The user can identify high risk tools and mark potential risks in those tools as mitigated, pending mitigation, or no mitigation action required.

19 Claims, 7 Drawing Sheets

Fig. 5

SPREADSHEET MANAGEMENT AND AUTOMATED REVIEW

TECHNICAL FIELD

The present disclosure relates generally to systems and methods for detecting and reducing risks associated with errors introduced by faults in spreadsheet formulas or programming.

BACKGROUND

Businesses use digital spreadsheets to process information in order to aid in decision making. These spreadsheets may access data from a number of sources, including other spreadsheets and databases. In addition to reading and accessing data, the spreadsheets may manipulate the accessed data. Thus, a spreadsheet may have the capability to amend data stored throughout an organization. Spreadsheets used by businesses may be highly sophisticated and contain a large number of cells within the spreadsheet. Additionally, the cells may contain mathematical or logical formulas associated with one or more cells which may be used to perform calculations and/or associations between the cells and the information contained within. In addition to formulas, programming may be created using languages such as virtual basic for applications (VBA) to perform functions using data stored in or accessed by the spreadsheet. If an error is introduced into a spreadsheet, data processed by or decisions made as a result of these formulas and programming could also be defective. Because of the large number of spreadsheets typically in use within a business, each of the spreadsheets potentially containing many formulas and programming, monitoring these spreadsheets for errors consumes a significant amount of resources. What is needed is a system for and method of automatically detecting and mitigating spreadsheet errors before they result in data corruption and/or incorrect decisions.

SUMMARY

The general disclosed concepts encompass systems and methods for detecting and mitigating errors in user tools used in connection with digital spreadsheets. In certain embodiments, these user tools are implemented in spreadsheets in the form of formulas and programming that can perform a function or functions desired by a user. These formulas and/or programming may retrieve data from data locations within the spreadsheet or may retrieve data from locations external to the spreadsheet. For example, data may be retrieved from a database and be used to calculate a result that is stored by the spreadsheet or in the database. In an exemplary embodiment, a two-step process is applied to user tools. In the first step, a user tool is evaluated and flagged to reflect the possible need for further evaluation or manual review. In some embodiments, a visual indicator may be used to mark a user tool that has been flagged. Visual indicators may change color to indicate a status related to the user tool e.g. a "red," "yellow," or "green" flag may be associated with a user tool depending upon the severity of the result of the evaluation of the tool. In the second step, the flags that represent a red or yellow status are reviewed and remediated as necessary and further flagged to reflect a remediation status. In certain exemplary embodiments, a report is generated that details the status of each reviewed user tool.

In an exemplary embodiment, the evaluation of a user tool is conducted by analyzing the user tool using a plurality of parameters and calculating a complexity score using the result of the analysis for each of the plurality of parameters. The complexity score is then assigned a ranking used to determine a risk status posed by the user tool.

The above and other aspects and advantages of the general disclosed concepts will become more readily apparent from the following description and figures, illustrating by way of example the principles of the general disclosed concepts.

BRIEF DESCRIPTION OF THE DRAWINGS

These and other features of the disclosure will become better understood with regard to the following description and accompanying drawings in which:

FIG. 5 is a screenshot of a user interface displaying a spreadsheet with potential errors that is to be processed, according to an exemplary embodiment;

DETAILED DESCRIPTION

Figure 1:
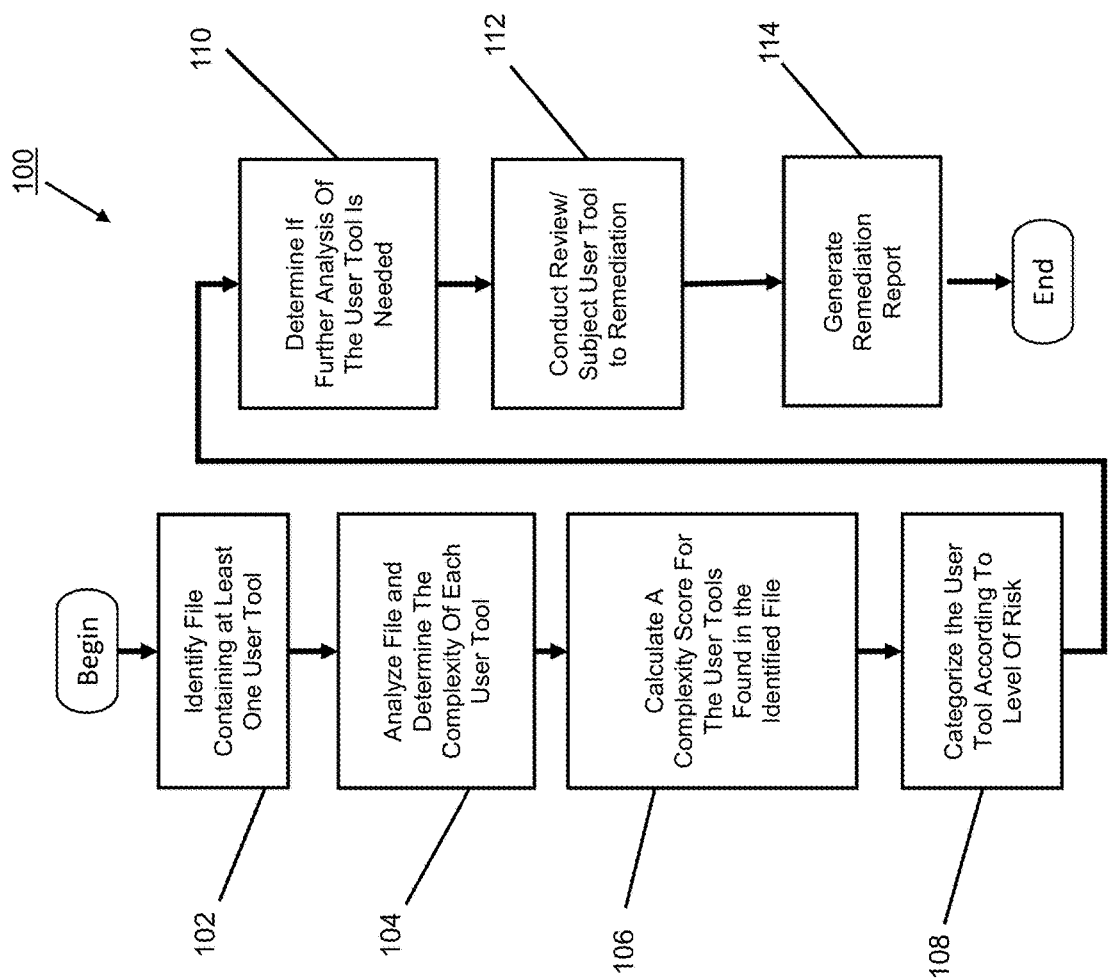
FIG. 1 is a flow chart illustrating a method of reviewing user tools, according to an exemplary embodiment.

In exemplary embodiments of the present disclosure, a review process is applied to user tools used within an organization. These user tools may be programs that are created using a programming language such as visual basic for applications (VBA). User tools can also be formulas created in a digital spreadsheet. In many organizations, user tools are created by users to act on internal and/or external data to solve a problem critical to that user. This creates potential problems as organizations often have hundreds, if not thousands, of users. Many of these users may require data that isn't easily obtained using available queries and, thus, create a plurality of user tools to satisfy their specific needs for such data. Consequently, there may be hundreds of user tools implemented throughout an organization.

The risk to an organization presented by a user tool is directly related to the complexity of that user tool. In an exemplary embodiment, the complexity of a user tool is determined by analyzing a plurality of parameters related to the user tool. Examples might comprise the number of cells in the spreadsheet, the number of sheets in the workbook of sheets, the presence of pivot tables, and the presence of formulas. User tools that call external references (using, for example, application add-in calls) are frequently a source of risk. As such, an exemplary embodiment may weight such characteristics more highly with regard to risk than other functions present in a particular user tool. A listing of possible parameters, according to an exemplary embodiment, is shown in Table 1. It will be appreciated that Table 1 is a non-exhaustive list of possible parameters and additional parameters are contemplated.

TABLE 1

| Field | Description/Comments |
|---|---|
| FileName | Workbook name |
| Complexity | Deciphometer Model Complexity Score (<8.6: Low, >=8.6: High) |
| CalcMode | Calculation Mode: Auto, Manual, AutoNoTable (Tables - manual, the rest - Auto) |
| FileSizeBytes | The size of the file in bytes |
| Tabs | Total number of worksheets |
| VisibleTabs | Number of visible worksheets |
| HiddenTabs | Number of hidden worksheets |
| VeryHiddenTabs | Number of very hidden worksheets |
| tabMaxCol | The highest number of columns in a single worksheet |
| tabMaxRow | The highest number of rows in a single worksheet |
| Rows | Total number of rows in the workbook |
| Cols | Total number of columns in the workbook |
| CellsWithDataVal | Number of cells with data validation |
| UnusedDefinedNames | Number of unused (unreferenced) defined names |
| NameRangeErrors | Number of named ranges with errors |
| NameRangeExtLink | Number of ranges with external links (external files) |
| NonContDefNameRange | Number of non-continuous defined named ranges |
| NoDepNoPrecWorksheets | Number of worksheets without any dependents OR precedents |
| NoDepWorksheets | Number of worksheets without any dependents BUT WITH precedents |
| CondFormHardStrings | Number of cells with conditional format and hardcoded literals |
| CondFormHardDigits | Number of cells with conditional format and hardcoded numbers |
| HiddenCellRef | Number of references to hidden cells |
| HiddenCols | Number of hidden columns |
| HiddenRow | Number of hidden rows |
| HighlyUsedCells | Number of highly used (>5 dependents) cells |
| HighlyUsedRanges | Number of highly used (>5 dependents) ranges |
| FilteredRowCol | Total number rows or columns hidden by a filter |
| CamoSameColorFontBack | Number of possible camouflage cells (font color = background color) |
| CamoCustFormat | Number of possible camouflage cells (custom format) |
| ColorNegNum | Number of possible camouflage cells (color formatting negative numbers) |
| Formatting | Number of possible camouflage cells (negative numbers formatted as positive) |
| SmallFont | Number of possible camouflage cells (font size <6)) |
| MagicNum | Number of cells with formulas containing hardcoded "magic" numbers (0.08, .25, .75, 4, 9, 12.5, 252, 365, 365.25) |
| HighRiskForm | Number of cells with "high-risk" formulas (>=5 function calls) |
| ArraySmall | Number of cells using "Small" array function |
| ArrayLarge | Number of cells using "Large" array function |
| ArrayTable | Number of cells using "Table" array function |
| LookupFunc | Number of cells with lookup functions (HLOOKUP, VLOOKUP, MATCH) |
| LookupExact | Number of cells with lookup functions (HLOOKUP, VLOOKUP, MATCH) with EXACT match |
| LookupApprox | Number of cells with lookup functions (HLOOKUP, VLOOKUP, MATCH) with APPROXIMATE match |
| NestedIfs | Number of cells with nested IFs |
| FormStartPlusMinus | Number of cells with formulas starting with "+" or "−" |
| FormulasWithNoRef | Number of cells with formulas not referencing other cells or ranges |
| BlankCellRef | Number of formulas referencing blank cells |
| FormWithHardCodedVal | Number of cells with formulas containing hardcoded numbers or literals |
| HiddenDefinedNames | Number of hidden defined names |
| DefinedNames | Number of workbook (global) defined names |
| DefinedNamesTab | Number of worksheet (local) defined names |
| PivotTables | Number of pivot tables |
| PivotCaches | Number of pivot caches |
| DataTables | Number of data tables |
| VBAModules | Number of VBA modules |
| VBALinesOfCode | Total number of VBA lines of code |
| Charts | Number of charts |
| ChartSheets | Number of chart sheets |
| Drawings | Number of drawings (charts + images + shapes) |
| ALIBCalls | Number of cells with ALIB calls |
| QLIBCalls | Number of cells with QLIB calls |
| CMLIBCalls | Number of cells with CM LIB calls |
| DataQueryCalls | Number of cells with DataQuery calls |
| 3rdPartyAddinCalls | Number of cells with add-in calls |
| Cells | Total number of cells in used ranges |
| MergeCells | Total number of merge cells |
| FormulaCells | Total number of cells with formulas |
| ErrorCells | Total number of cells with errors ("#DIV/0!", "#N/A", "#NAME?", "#NULL!", "#NUM!", "#REF!", "#VALUE!") |
| DatabaseFuncCalls | Total number of cells with database functions |
| DateTimeFuncCalls | Total number of cells with date/time functions |
| EngineeringFuncCalls | Total number of cells with engineering functions |
| FinancialFuncCalls | Total number of cells with financial functions |
| InfoFuncCalls | Total number of cells with info functions ("INFO", "ISERR", "ISNA", "ISEVEN" . . . etc.) |
| LogicalFuncCalls | Total number of cells with logical functions ("AND", "FALSE", "IF", "NOT", "OR", "TRUE") |
| LookupRefFuncCalls | Total number of cells with lookup/reference functions ("ADDRESS", "CHOOSE", "COLUMNS", "INDIRECT", "RTD", "TRANSPOSE" . . . etc.) |
| MathTrigFuncCalls | Total number of cells with math/trigonometric functions |
| StatFuncCalls | Total number of cells with statistical functions |
| TextFuncCalls | Total number of cells with text functions ("LEFT", "REPLACE", "LENB", "TEXT", "UPPER" . . . etc.) |
| SharedDriveLink | Number of shared drive links |
| LocalDriveLinks | Number of local drive links |
| Hyperlinks | Number of hyperlinks (http) |
| FuncCalls5to10 | Total number of cells with 5 <= # of functions <10 |
| FuncCalls10to20 | Total number of cells with 10 <= # of functions <20 |
| FuncCalls20to50 | Total number of cells with 20 <= # of functions <50 |
| FuncCalls50+ | Total number of cells with 50 <= # of functions |
| FormLen50to100 | Total number of cells with 50 <= formula length in characters <100 |
| FormLen100to200 | Total number of cells with 100 <= formula length in characters <200 |

TABLE 1-continued

| Field | Description/Comments |
|---|---|
| FormLen200to500 | Total number of cells with 200 <= formula length in characters <500 |
| FormLen500+ | Total number of cells with 500 <= formula length in characters |
| Directory | File directory |
| Ext | File extension |
| ReadOnly | File read-only |
| CreateTimeUTC | File create time UTC |
| LastAccessTimeUTC | File last access time UTC |
| LastWriteTimeUTC | File last write time UTC |
| Author | Workbook Author |
| Comments | Workbook Comments |
| Company | Workbook Company |
| ProcessErrors | Decipher file processing errors (TRUE/FALSE) |
| ProcessErrorsDescription | Decipher file processing errors description (if ProcessErrors = TRUE) |

In an exemplary embodiment, the complexity of a user tool is calculated using Equation 1. This equation can be expanded to include other items presented in Table 1.

$$\text{Complexity} = 100/(1+e^{-t}) \quad \text{Equation 1}$$

Where t=constants and/or scaling factors associated with one or more of the above exemplary characteristics listed in Table 1. For example, t may be defined as shown below:

where:

$$t = -17.4483 + 0.2183 \times \log10(\text{filesizebytes}) + 0.03533 \times \text{tabs} + 5.9693 \times \log10(1 + \text{vbalinesofcode}) + 0.5588 \times (1 + \text{formlen200to500})$$

The result of Equation 1 is a number representing a complexity score, which ranges from slightly greater than 0 to less than or equal to 100. For example, a low complexity file, with 1 tab, no VBA code, no long formulas, and a file size of 1 byte results in a value of 0.000002644232. This number represents the "complexity score" of a user tool, which can be used to estimate the amount of risk introduced by the user tool. Generally, a higher level of complexity results in a higher level of risk resulting from use of the tool. Each item may have a scaling factor as illustrated. In exemplary embodiments that include additional characteristics from Table 1, each item may be assigned a constant and/or scaling factor, as illustrated in the exemplary value of "t" with regard to filesizebytes, tabs, vbalinesofcode, and formlen200to500 as shown above. While in some embodiments complexity is determined using Equation 1, it will be appreciated that various other algorithms, equations, or the like may be utilized to calculate a complexity score as described herein.

A process 100 for analyzing a user tool is illustrated in the flowchart of FIG. 1. As shown, in step 102, a file which contains at least one user tool is identified. In step 104, the identified file is analyzed, for example, using Equation 1. A complexity score is calculated for each user tool at step 106. In step 108, the complexity score is used to categorize the analyzed user tool into a group according to its level of complexity (and thus risk). An exemplary embodiment may categorize complexity scores into groups of: Low complexity (0<complexity score<49); Medium complexity (49<=complexity score<89); and High complexity (89<=complexity score<=100).

At step 110, it is determined if further analysis of a user tool is needed. This determination may be made according to the complexity score. For example, in an exemplary embodiment, a low complexity score may not require any further analysis, while medium and high complexity scores may require further analysis. In such exemplary embodiments, user tools with high complexity scores may be prioritized for review and remediation over user tools with low or medium complexity scores.

If the analysis determines that review and remediation of the risk is required, the user tool is subject to a review and/or remediation process in step 112. In some exemplary embodiments, a review and remediation report is generated in step 114 to record the status of each analyzed user tool. In certain exemplary embodiments, the review and analysis include checking against a library of design rules which when violated can be a potential source of error. In an exemplary report, a user tool may be identified and a status such as remediated, not remediated, or remediation not required, may be associated with each identified violation in the user tool.

Exemplary embodiments may comprise various high priority design rules such as, for example: Are there add-in calls in the user tool? Are there ALIB functions within the user tool? Are there approximate lookups found in the user tool? Are blank cell references found in the user tool? Is "recalculate before saving" enabled/disabled in the user tool? Is the calculation state of the user tool pending or done? Is there a circular reference error found in the user tool? Are there CMLIB functions found in the user tool? Are their data query functions found in the user tool? Are there duplicate defined names in the user tool? Are there hidden defined names in the user tool? Are there non-contiguous defined names found in the user tool? Are there unused defined names found in the user tool? Are there formulas that contain a double minus sign found in the user tool? Are there divide by zero errors found in the user tool? Are there #N/A errors found in the user tool? Are there #NAME errors found in the user tool? Are there #NULL errors found in the user tool? Are there #NUM errors found in the user tool? Are there #REF errors found in the user tool? Are there #VALUE errors found in the user tool? Are there hidden columns in the user tool? Are there hidden rows in the user tool? Are there hidden worksheets in the user tool? Are there inconsistent formulas within a row or column in the user tool? Are there inconsistent formulas within a region or sheet of the user tool? Are there inconsistent formulas in a range within the user tool? Are there formulas that omit adjacent cells within the user tool? Are there unrefreshed pivot tables found in the user tool? Are there pivot tables with data located below the pivot table in the user tool? Are there pivot tables with data located beside the pivot table in the user tool? Are there pivot tables with data sources located below the pivot table in the user tool? Are there pivot tables with data sources located beside the pivot table in the user tool? Are there are pivot tables with calculated fields found within the UT? Are there QLIB calls within the UT? Are there VBA-coded hidden worksheets found in the UT? Are there volatile functions found in the user tool?

Exemplary embodiments may comprise such medium priority design rules such as, for example: Are there INDIRECT functions found in the user tool? Are their nested "if" functions found in the user tool? Are there database functions found in the user tool? Are there formulas formatted at text in the user tool? Are there formulas with blank output found in the user tool? Are there hardcoded numbers found in formulas of the user tool? Are there hyperlinks found in the user tool? Are there local drive links found in the user tool? Are there modules in VBA code of a user tool that lack the Option Explicit declaration? Are modules in the VBA code of a user tool that contain the "On Error Resume Next" statement? Are there modules in the VBA code of the user tool that contain the "STOP" statement? Are there numbers formatted as text in the user tool? Are there share drive links found in the user tool?

Exemplary embodiments may comprise various low priority design rules such as, for example: Area there defined names found in the user tool? Are there exact lookups found in the user tool? Are there hardcoded strings within formulas found in the user tool? Is the "IFERROR" function used in the user tool? Is the "ISERR" function used in the user tool? Are there formulas that start with a "−" sign found in the user tool? Is cache data feeding pivot tables in the user tool? Are their pivot tables in the user tool? Are their standalone tabs without precedents or dependents found in the user tool? Is there a high ratio of unused to used cells detected in tabs of the user tool?

In some exemplary embodiments, an owner or developer of the user tool can initiate the analysis of the user tool according to the process 100 of FIG. 1. In order to better control the application of a remediation process, exemplary embodiments may prevent the owner or developer from determining whether remediation is required (flagging). However, the complexity score determined at step 106 and the remediation report of step 114 may be provided to the owner or developer in order to assist remediation efforts initiated by a user or others.

Figure 2:
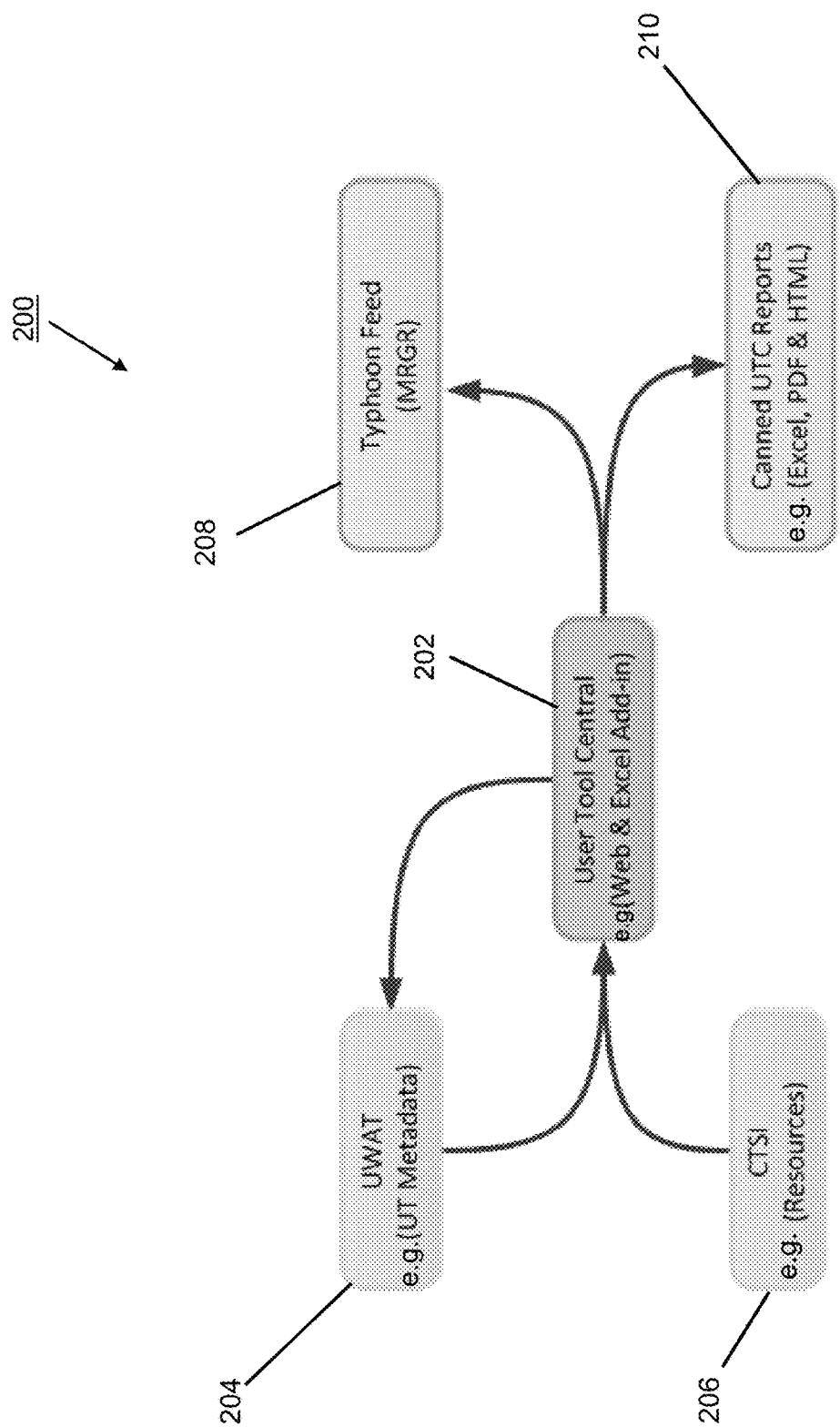
FIG. 2 is a high-level system structure diagram of a user tool management system according to an exemplary embodiment.

FIG. 2 illustrates a high-level structure 200 for implementing a user tool central (UTC) system 202 according to an exemplary embodiment. In certain embodiments UTC system 202 may be implemented as an add-in extension application to a website or a spreadsheet management application, e.g. Microsoft Excel®. An inventory of user tools is maintained in in a User Workflow Assessment Toolkit (UWAT) 204. The UWAT 204 also maintains a listing of user tool risk classifications and user tool owner information e.g. user tool metadata. Corporate Technology Service Infrastructure (CTSI) 206 provides resources to the UTC 202 while a feed to a change management system, e.g. Typhoon Feed 208 managed by a Model Risk Governance and Review (MRGR) group, provides a change management function for tracking changes to user tools that implement models. Pre-defined (e.g. canned) UTC reports 210 may be produced by the UTC 202 for reporting the status of user tool risks. In an exemplary embodiment, these reports may be spreadsheets, PDF's, or HTML documents and comprise such information as user tool function, risk score, risk classification, owner, and remediation status. Such reports may be used to determine risks presented to an organization by the various user tools in use by that organization.

Figure 3:
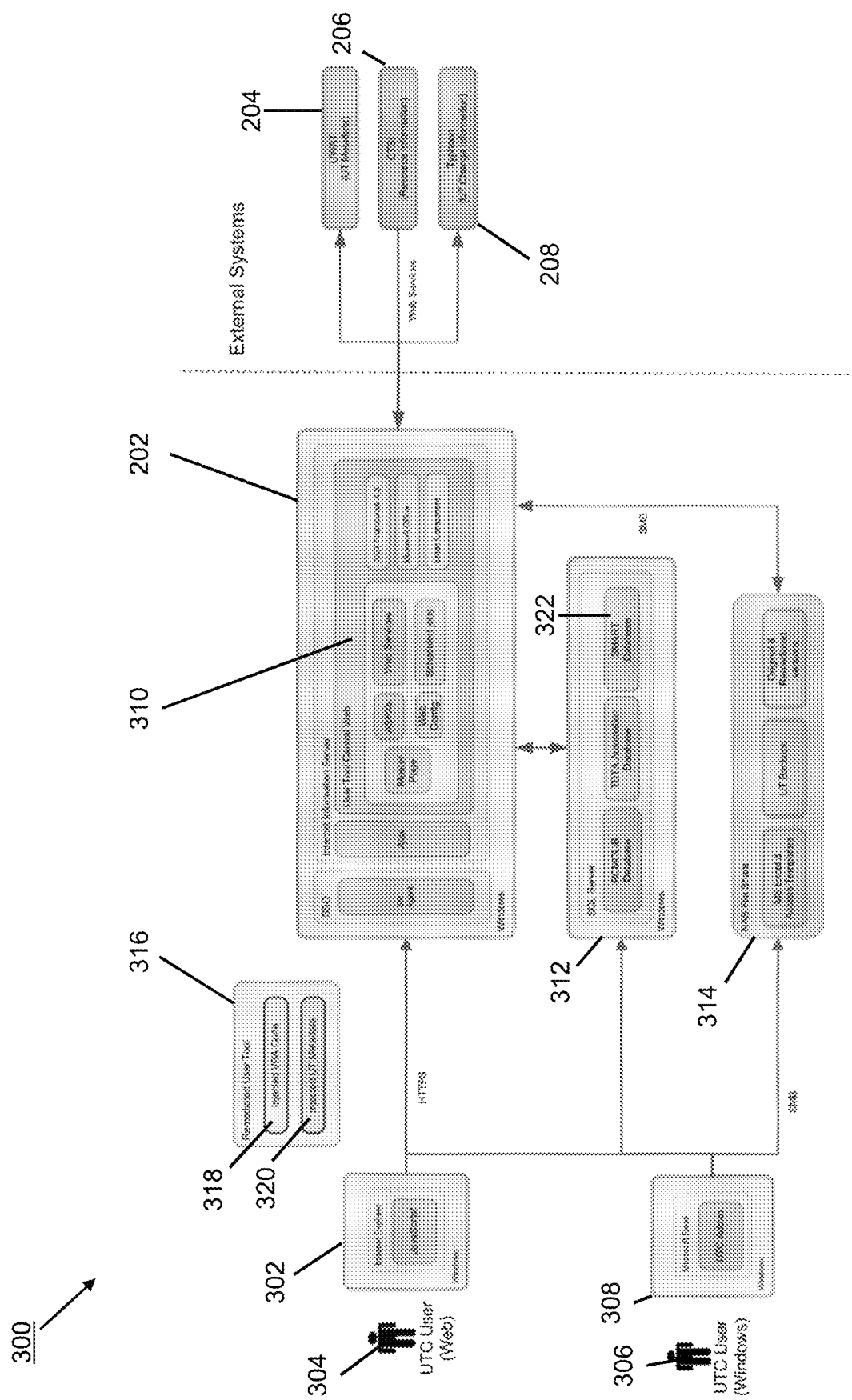
FIG. 3 is an application structure diagram of the user tool management system of FIG. 2.

FIG. 3 illustrates an application structural view 300 of the UTC 202 according to an exemplary embodiment. As illustrated in the exemplary embodiment, users may access the UTC 202 in different ways according to the access method of the user. As shown on the left side of FIG. 3, a first UTC user 304 accessing the UTC 202 using a web interface (e.g. a web browser, for example, Microsoft Internet Explorer®) connects using JavaScript 302 while a second UTC user 306 accessing the UTC 202 using a Windows® operating system may utilize a Microsoft Excel® add-in 308. Each of these interfaces (302 and 308) connects to the components of the UTC 202 (comprised of a User Tool Central Web 310, a SQL server 312, and a NAS file share system 314). As illustrated, the SQL server 312 and NAS file share system 314 are each in communication with the UTC 202. The UTC 202 is also in communication with external systems such as the UWAT 204, the CTSI 206, and a Typhoon Feed 208.

In addition to the risk analysis functions previously described herein, exemplary embodiments may also comprise remediated user tool 316. In certain exemplary embodiments, these tools include a first tool 318 to inject computer code (VBA code) into a target user tool and also a second tool 320 to inject user tool metadata into the user tool. These tools 316 and 318 serve to standardize the VBA code and metadata used by user tools in order to improve standardization, maintainability, and thus reliability of the user tools.

In addition to the risk analysis functions described herein, exemplary embodiments may also comprise spreadsheet management and automated review tools 322 (e.g. SMART Database) which may include a user tool integrity scanner comprising a library of rules and common errors used to review the user tool. These rules are applied to a user tool in order to detect conditions related to the rules of the automated review tool 322.

In addition to the scanning and analysis functions described herein, exemplary embodiments of the UTC 202 may comprise control functions such as access control, version control, and change control in order to preserve the integrity of a user tool. Additionally, the UTC 202 may comprise backup, recovery, and retention functionality which provide on-demand and scheduled backup capability. Exemplary embodiments may comprise documentation for the user tool. This documentation may further be embedded within the user tool. Such an exemplary embodiment may also comprise a function that provides documentation reports in multiple formats including, without limitation, HTML and PDF.

Figure 4:
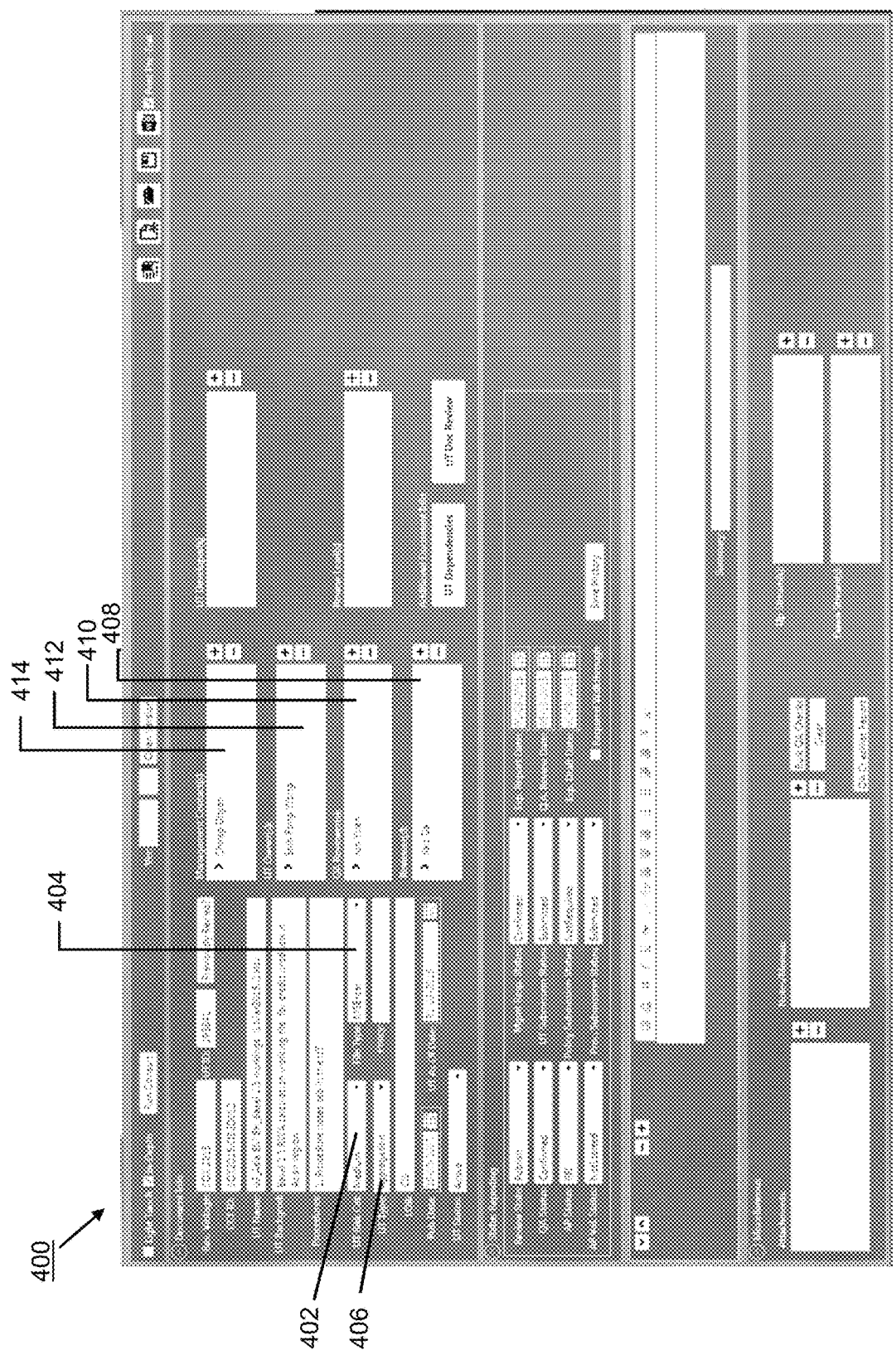
FIG. 4 is a screenshot of a user interface displaying user tool information and status, according to an exemplary embodiment.

As illustrated in FIG. 4, a user interface 400 can provide a user with a snapshot of the status of a user tool. As illustrated, the user interface 400 comprises information related to the user tool with regard to the title and the Line Of Business (LOB) associated with the user tool. For example, a user may be able use such a user interface 400 to obtain background regarding the user tool such as risk category 402, file type 404, and the type of function 406 provided by the user tool. In addition, contacts such as reviewers 408 and 410, owners 412, and management contacts 414 may be included in the user interface 400. A listing of reporting function statuses may be included in order to allow a user to easily review and update the status of a user tool.

Figure 5:
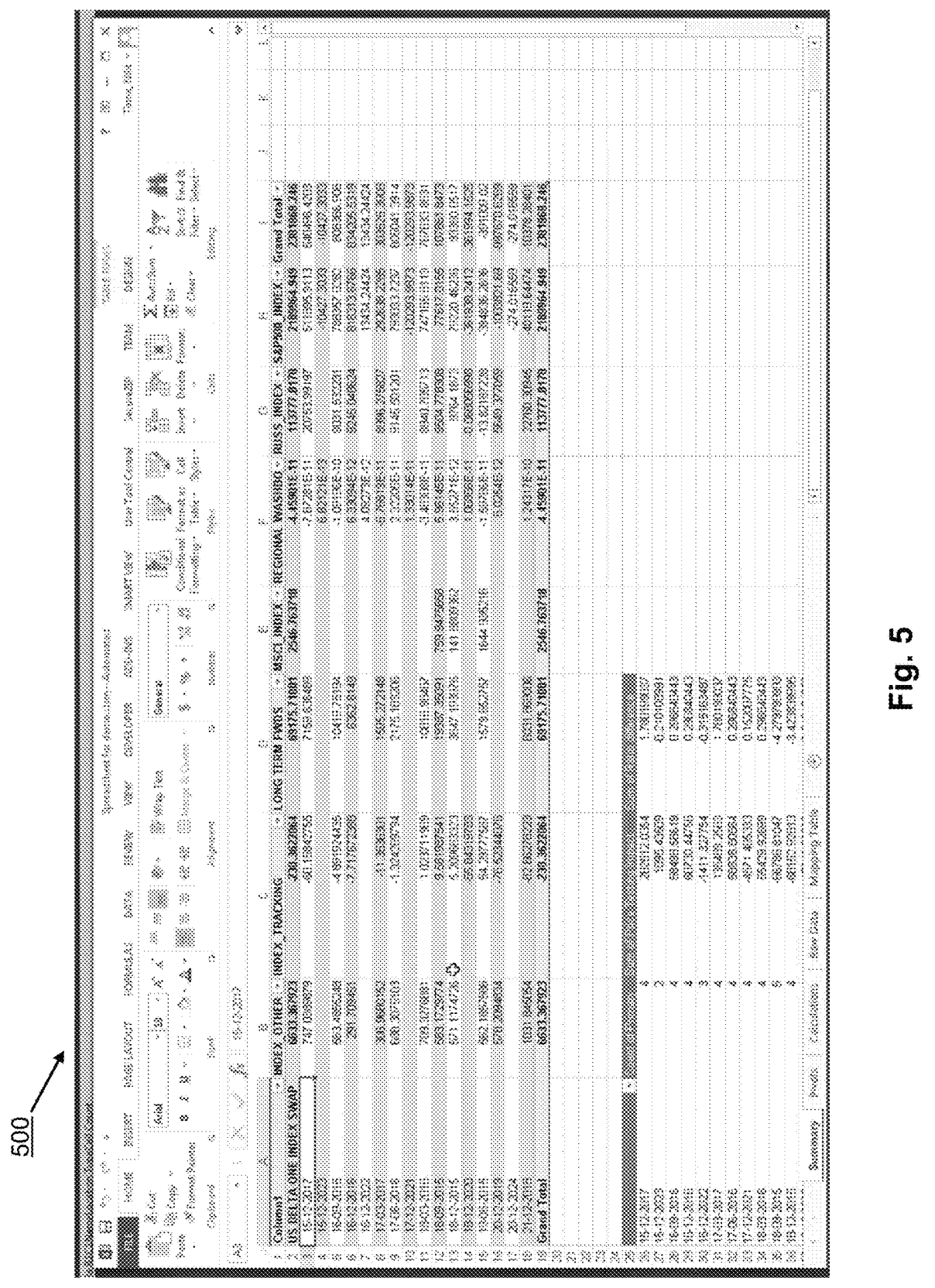
Figure 6:
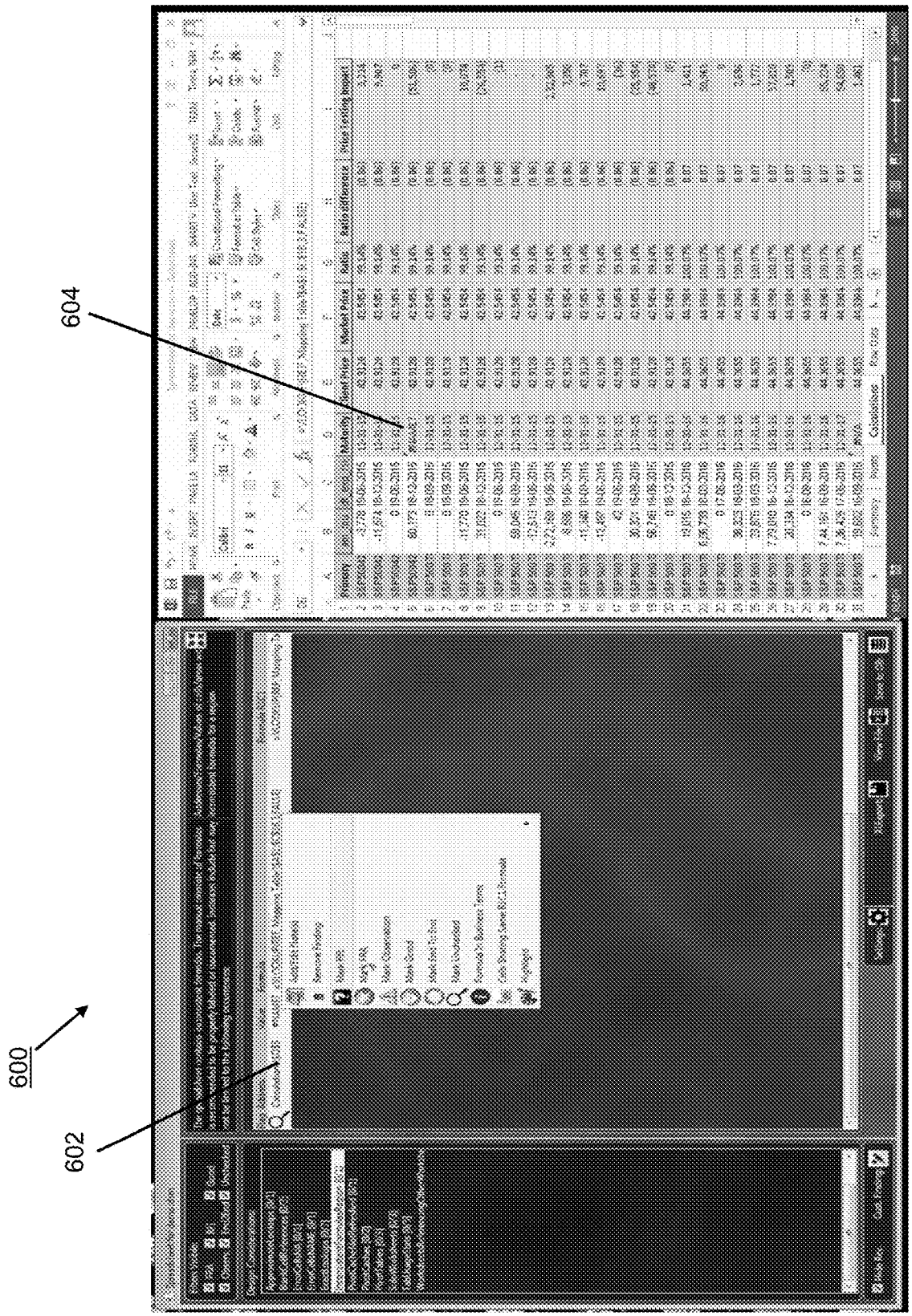
FIG. 6 is a screenshot of a user interface displaying the result of an analysis of a spreadsheet which includes a detected error, and an illustration of where that error is located within the spreadsheet, according to an exemplary embodiment.

FIG. 5 illustrates a first user interface 500 which displays a spreadsheet comprising a user tool that is to be analyzed. FIG. 6 illustrates an exemplary embodiment of a second user interface 600 which displays the partial results of an analysis performed on the spreadsheet of FIG. 5. As illustrated, a cell has been identified as having an inconsistent formula 602. The inconsistent formula 602 is displayed in a left-hand window which displays the formula determined to have an inconsistency. In a second portion of the user interface 600, the inconsistency detected by the analysis is displayed at 604. Such a display 604 permits a user to identify and view the inconsistencies detected by the analysis in order to mitigate those inconsistencies before they can result in data corruption or runtime errors in a production environment.

Figure 7:
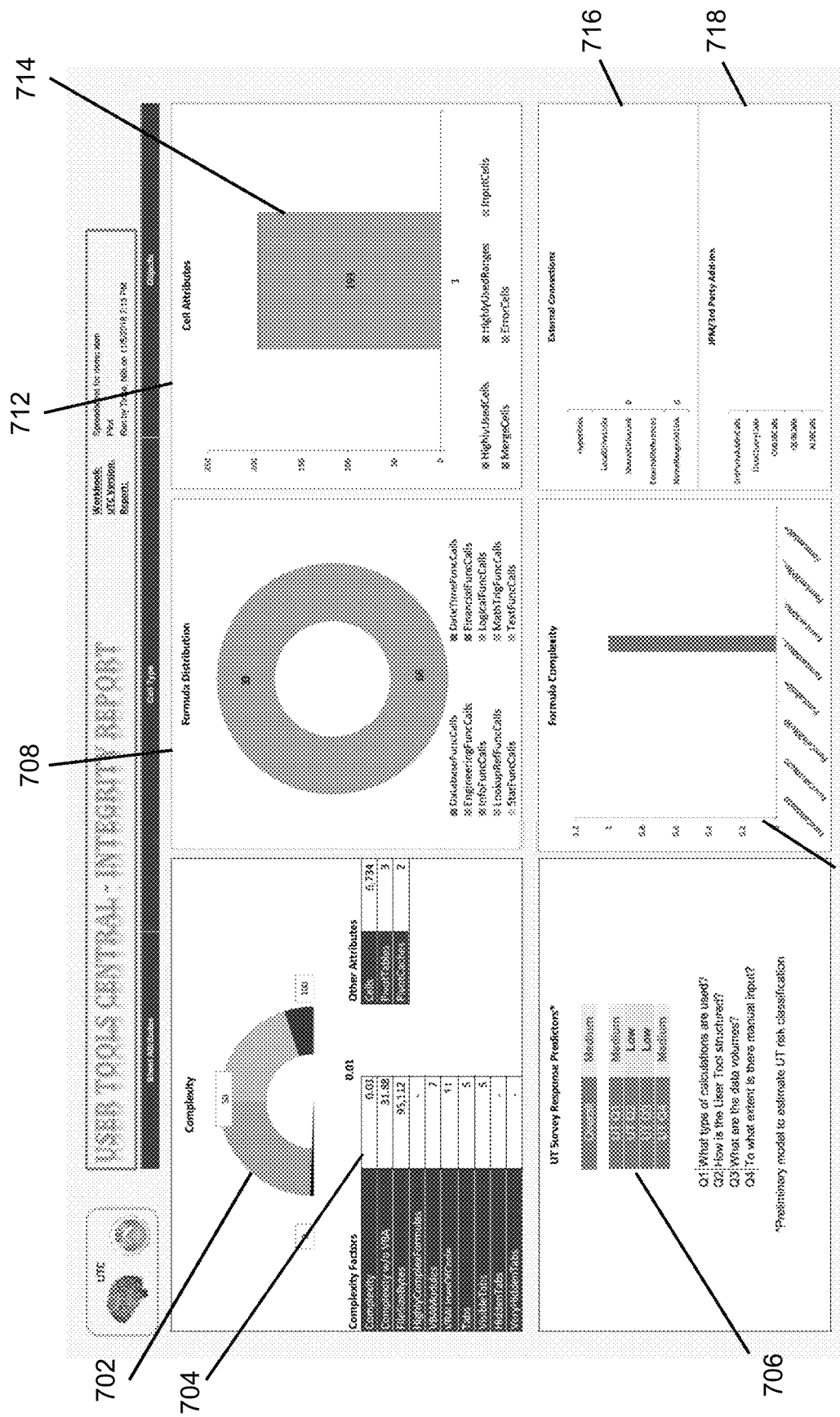
FIG. 7 is an illustration of a user interface displaying an integrity report for a user tool according to an exemplary embodiment.

An exemplary user tool integrity report 700 is illustrated in FIG. 7. As shown, the calculated complexity score 702 is displayed in a portion of the report. While shown in a particular graph arrangement, it will be appreciated that the complexity score 702 may be represented in alternative formats, i.e. bar graph, pie chart, etc. In some embodiments, the complexity score will be accompanied by one or more visual indicators to enhance a user's ability to easily comprehend the complexity represented by the complexity score. In addition to the calculated complexity 702, other parameters 704 related to complexity or the complexity score of the user tool may be displayed. In another section of the user tool integrity report 700, a series of predictors 706 may be displayed to permit a user to identify the factors that most contribute to a particular risk category assignment. For example, in the exemplary user tool integrity report 700, an overall risk classification of "high" is assigned. A user can review the displayed predictors 706 to determine that the high-risk score is predominantly the result of a high score resulting from calculations and structure of the user tool. In the user tool integrity report 700, an analysis of the formulas present in the user tool is provided at 708. Formula complexity is displayed at 710. The attributes of user tool cells are displayed at 712. Cell attributes 714 may display attributes of the cells of the user tool, such as, for example, the number of highly used cells, merged cells, highly used ranges, error cells, input cells, etc. In another section of the user tool integrity report 700, external connections are illustrated 716. In the exemplary embodiment, the external connections are reported as external references. Other external connections reported may comprise hyperlinks, local drive links, shared drive links, and name range external links. As shown in section 718 of the user tool integrity report 700, add-ins are reported.

While the present disclosure and associated concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the disclosure.

What is claimed is:

1. A system for determining risk to an organization posed by a user tool to be deployed within the organization, the system comprising:
   a processor in communication with a memory;
   software instructions stored in the memory that when executed by the processor, cause the processor to:
   receive a data file comprising at least one user tool;
   analyze the data file to determine the complexity of the user tool;
   calculate a complexity score for the user tool;
   determine a risk category based on the calculated complexity score;
   inject a user tool metadata into programming code of the user tool, the user tool metadata including the risk category and owner information corresponding to the user tool;
   determine if additional analysis is required using the risk category;
   evaluate, by using a user tool integrity scanner, the user tool based on a library of one or more rules and common errors;
   determine whether an error exists in the user tool based on the one or more rules, the error being related to data of the data file; and
   upon determining that the error exists, display the error via a graphical user interface, the graphical user interface including a review and remediation report.

2. The system of claim 1, wherein, for calculating the complexity score, the processor is further configured to:
   identify a plurality of characteristics of the data file;
   apply a weighting factor to each of the characteristics by multiplying the weighting factor and each characteristic, and adding the weighted characteristics together to generate a factor for use in a complexity score calculation; and
   apply the factor to a complexity score equation to calculate the complexity score for the received data file.

3. The system of claim 1, further comprising software instructions that when executed by the processor, cause the processor to inject computer code into the user tool.

4. The system of claim 3, wherein the computer code injected into the user tool is provided in the visual basic for applications programming language.

5. The system of claim 1, further comprising software instructions that when executed by the processor, cause the processor to inject metadata into the user tool.

6. The system of claim 1, further comprising a user tool integrity scanner that uses a predefined library of rules and errors to detect errors in the user tool.

7. The system of claim 1, wherein the risk category is one of low complexity, medium complexity, and high complexity.

8. The system of claim 7, wherein the complexity score ranges from greater than 0 to less than or equal to 100 and the low complexity risk category is applied to risk scores that range from greater than 0 to less than 49, the medium complexity risk category is applied to risk scores that range from 49 to less than 89, and the high complexity risk score is applied to risk scores that range from 89 to less than or equal to 100.

9. The system of claim 8, wherein further analysis is performed if the risk category is medium complexity or high complexity.

10. The system of claim 1, wherein the user interface displays the risk category.

11. The system of claim 1, wherein the user interface displays an indication of an error detected during the analysis of the user tool.

12. A method of determining risk to an organization posed by a user tool to be deployed within the organization comprising:
   receiving a data file comprising at least one user tool;
   analyzing the data file to determine the complexity of the user tool;
   calculating a complexity score for the user tool;
   determining a risk category based on the complexity score;
   inject a user tool metadata into programming code of the user tool, the user tool metadata including the risk category and owner information corresponding to the user tool;
   determining if additional analysis is required using the risk category;
   evaluate, by using a user tool integrity scanner, the user tool based on a library of one or more rules and common errors;
   determining whether an error exists in the user tool based on the applied one or more rules, the error being related to data of the data file; and upon determining that an error exists, displaying the error via a graphical user interface, the graphical user interface including a review and remediation report.

13. The method of claim 12, where the calculating a complexity score further comprises:
identifying a plurality of characteristics of the data file;
applying a weighting factor to each of the characteristics by multiplying the weighting factor and each characteristic, and adding the weighted characteristics together to generate a factor for use in a complexity score calculation; and
applying the factor to a complexity score equation to calculate the complexity score for the received data file.

14. The method of claim 12, further comprising injecting computer code into the user tool.

15. The method of claim 14, wherein the computer code injected into the user tool is provided in the visual basic for applications programming language.

16. The method of claim 12, further comprising the step of injecting metadata into the user tool.

17. The method of claim 12, further comprising using a library of rules and errors to detect errors in the user tool.

18. The method of claim 12, wherein the risk category is selected from the group consisting of low complexity, medium complexity, and high complexity.

19. The method of claim 12, further comprising displaying an indication of an error detected during the analysis of the user tool.

\* \* \* \* \*